US008165089B2

(12) United States Patent
Jung et al.

(10) Patent No.: US 8,165,089 B2
(45) Date of Patent: *Apr. 24, 2012

(54) HANDOFF METHOD BETWEEN HETEROGENEOUS NETWORKS AND SYSTEM THEREOF

(75) Inventors: Jung-Soo Jung, Seongnam-si (KR);
Beom-Sik Bae, Suwon-si (KR);
Dae-Gyun Kim, Seongnam-si (KR);
Kyung-Joo Suh, Seoul (KR)

(73) Assignee: Samsung Electronics Co., Ltd (KR)

( * ) Notice: Subject to any disclaimer, the term of this patent is extended or adjusted under 35 U.S.C. 154(b) by 869 days.

This patent is subject to a terminal disclaimer.

(21) Appl. No.: 11/970,307

(22) Filed: Jan. 7, 2008

(65) Prior Publication Data

US 2008/0176569 A1    Jul. 24, 2008

(30) Foreign Application Priority Data

Jan. 5, 2007    (KR) .......................... 10-2007-0001792

(51) Int. Cl.
*H04W 4/00*    (2009.01)
(52) U.S. Cl. ....................................... 370/331; 455/436
(58) Field of Classification Search .................. None
See application file for complete search history.

(56) References Cited

U.S. PATENT DOCUMENTS

| 8,036,175 | B2 * | 10/2011 | Suh et al. ....................... 370/331 |
| 2002/0067707 | A1 * | 6/2002 | Morales et al. ................ 370/331 |
| 2003/0135626 | A1 * | 7/2003 | Ray et al. ....................... 709/228 |
| 2004/0193712 | A1 * | 9/2004 | Benenati et al. .............. 709/225 |
| 2005/0068929 | A1 | 3/2005 | Chang et al. |
| 2005/0136920 | A1 * | 6/2005 | Rink et al. ..................... 455/433 |
| 2007/0208864 | A1 * | 9/2007 | Flynn et al. .................... 709/227 |
| 2007/0254661 | A1 * | 11/2007 | Chowdhury et al. ......... 455/436 |
| 2008/0125126 | A1 * | 5/2008 | Fang et al. .................... 455/436 |

FOREIGN PATENT DOCUMENTS

| JP | 2003-235064 | 8/2003 |
| JP | 2005-130487 | 5/2005 |
| WO | WO 2004/032539 | 3/2004 |

OTHER PUBLICATIONS

Tanehiko Chiba et al., "High-Speed Hand-Off Method by Preservation and Transmission of PPP Session Information", Proceedings of the 2004 IEICE Communications Society Conference, Sep. 21-24, 2004.

* cited by examiner

*Primary Examiner* — Chi Pham
*Assistant Examiner* — Kouroush Mohebbi
(74) *Attorney, Agent, or Firm* — The Farrell Law Firm, P.C.

(57) ABSTRACT

A method and system for performing handoff between a source system and a target system are provided. The target system has a different network access standard from that of the source system. An access terminal, connected to the source system, transmits a request message including an identifier of the access terminal to be identified in the target system, to the target system, via the source system, in order to access the target system. A session storage of the target system acquires the identifier of the access terminal from the access terminal via the source system. The session storage of the target system acquires session information of the access terminal from an old session storage to which the access terminal was connected before it accesses the source system, using the acquired identifier. After the session information is acquired, a gateway of the target system acquires context information related to a data service of the access terminal from a gateway of the source system. After handoff of the access terminal, the target system provides the data service to the access terminal using the session information and the data service-related information.

23 Claims, 8 Drawing Sheets

HANDOFF METHOD BETWEEN HETEROGENEOUS NETWORKS AND SYSTEM THEREOF

PRIORITY

This application claims priority under 35 U.S.C. §119(a) to a Korean Patent Application filed in the Korean Intellectual Property Office on Jan. 5, 2007 and assigned Serial No. 2007-1792, the disclosure of which is incorporated herein by reference.

BACKGROUND OF THE INVENTION

1. Field of the Invention

The present invention relates generally to a method for performing handoff in a mobile communication system and a system thereof, and more particularly, to a method capable of seamlessly and efficiently performing handoff of a data service between the different types of network access systems and a system thereof.

2. Description of the Related Art

Wireless communication systems have been developed for situations in which it is not possible to connect a fixed wired network up to a terminal. With the progress of the communication technology, the wireless communication system has developed into the mobile communication system.

The $4^{th}$ generation mobile communication system supports ultrahigh-speed multimedia service beyond the $1^{st}$ generation analog system, the $2^{nd}$ generation digital system, and the $3^{rd}$ generation IMT-2000 system supporting the high-speed multimedia service.

Among the $3^{rd}$ generation mobile communication systems, the typical mobile communication system having a channel structure for high-speed data transmission includes a 1x Evolution Data Only (1xEVDO) system. The 1xEVDO system is a system using a Code Division Multiple Access (CDMA) scheme. A configuration of the common 1xEVDO system will be described with reference to FIG. 1. The 1xEVDO system includes a Packet Data Service Node (PDSN) 101, connected to the Internet 100, for transmitting high-speed packet data to Access Networks (ANs) 103, and a Packet Control Function (PCF) 102 for controlling the ANs 103. The ANs 103 each wirelessly communicate with a plurality of access terminals (ATs) 104, and transmit the high-speed packet data to the AT having the highest data rate.

The $4^{th}$ generation mobile communication system evolved from the $3^{rd}$ generation mobile communication system, such as the 1xEVDO system, aims at a data rate of 20 Mbps or higher for the ultrahigh-speed multimedia service, and uses the orthogonal frequency in transmitting signals like the Orthogonal Frequency Division Multiplexing (OFDM) scheme. The typical example of the $4^{th}$ generation mobile communication system can include the Worldwide Interoperability for Microwave Access (WiMax) system, the standardization of which is now in progress in Institute of Electrical and Electronics Engineers (IEEE). A configuration of the common WiMax system will be described with reference to FIG. 2. The WiMax system includes Base Stations (BSs) 202, each of which wirelessly communicates with a plurality of terminals 203 and supports the ultrahigh-speed multimedia service, and an Access Service Network (ASN) 201, connected to the Internet 200, for transmitting high-speed packet data to the BSs 202.

SUMMARY OF THE INVENTION

The present invention has been made to address at least the above problems and/or disadvantages and to provide at least the advantages described below. Accordingly, an aspect of the present invention provides a scheme capable of seamlessly performing handoff of a data service between different types of network access systems.

Another aspect of the present invention provides a scheme in which different network access systems each store and maintain session information such as network access setting information and Quality of Service (QoS) information used for transmitting data to a terminal in order to support seamless handoff between different types of network access systems.

A further aspect of the present invention provides a scheme in which when there is a need for handoff, a handoff target system acquires, from a source system, a terminal's identifier assigned to a terminal or an identifier of a system element in which the terminal has last registered its own information, and acquires session information of the terminal from the system that stores the information related to the session of the terminal using the acquired identifier.

An additional aspect of the present invention is to provide a scheme in which upon acquiring through a source system a terminal's identifier and an identifier of a system element that stores session information associated with the terminal, a target system acquires, from an element of the system in which session information is stored, the session information such as network access setting information and QoS information used for transmitting data to the terminal using the terminal's identifier and the identifier of the system element.

An aspect of the present invention provides a scheme in which a source system delivers to a target system not only the identifier information but also the data service-related information being used by the terminal, such as context information, for example, packet filter information and authentication information.

A further aspect of the present invention is provides a scheme in which an operation of acquiring, by a target system, the network access setting information and QoS information, and an operation of acquiring by the target system the data service-related information from a source system are performed before the terminal disconnects its wireless access to the source system.

Yet another aspect of the present invention provides a scheme in which upon acquiring the network access setting information, QoS information and data service-related information, a target system transmits an access message needed by a terminal for accessing the target system, to the terminal over the source system.

An aspect of the present invention is to provide a method capable of seamlessly performing handoff of a data service between the different system versions that use the same network access technology, and a system thereof.

According to one aspect of the present invention, a method for performing handoff between a source system and a target system having a different network access standard from that of the source system is provided. The handoff method includes transmitting, by an access terminal connected to the source system, a request message including an identifier of the access terminal to be identified in the target system to the target system via the source system in order to access the target system. A session storage of the target system acquires the identifier of the access terminal from the access terminal via the source system. Session information of the access terminal is acquired, by the session storage of the target system, from an old session storage to which the access terminal was connected before it accesses the source system, using the acquired identifier. Context information related to a data service of the access terminal from a gateway of the source system is acquired by a gateway of the target system, after the session information is acquired. The data service to the access terminal is provided by the target system using the session information and the data service-related information, after handoff of the access terminal.

According to another aspect of the present invention, a system for providing handoff between a source system and a target system having a different network access standard from that of the source system is provided. The handoff system includes an access terminal, connected to the source system, for transmitting a request message including an identifier to the target system via the source system in order to access the target system. The handoff system also includes a session storage of the target system for acquiring the identifier of the access terminal from the access terminal via the source system, and acquiring session information of the access terminal from an old session storage to which the access terminal was previously connected, using the acquired identifier. The handoff system further includes a gateway of the target system for, after the session information is acquired, acquiring context information related to a data service of the access terminal from a gateway of the source system. The session information and the context information are used for providing the data service to the access terminal after handoff of the access terminal.

According to a further aspect of the present invention, a method for performing handoff between a source system and a target system having a different network access standard from that of the source system, by an access terminal, is provided. Neighboring cell information is received from the source system. A request message for handoff to the target system is transmitted to the source system using the neighboring cell information. A request message including an identifier of the access terminal to be identified in the target system is transmitted to the target system via the source system, after transmitting the handoff request message. A new identifier is received by which the access terminal can be identified in the target system. The new identifier is assigned from the target system that has acquired session information of the access terminal and context information related to a data service of the access terminal, using the identifier transmitted by the access terminal. The data service provided from the target system is received using the session information and the context information.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
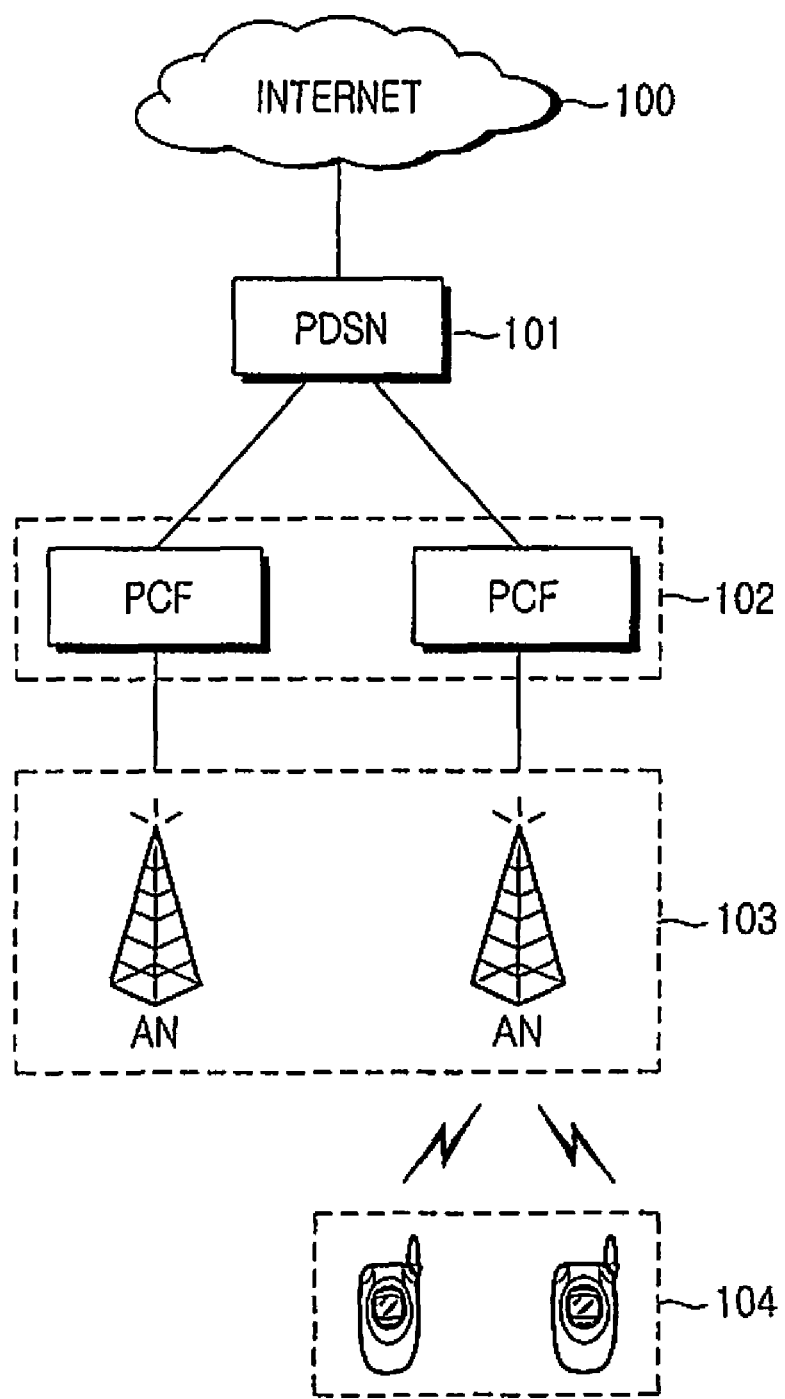
FIG. 1 is a diagram illustrating a configuration of a 1xEVDO system, or the common $3^{rd}$ generation mobile communication system.
Figure 2:
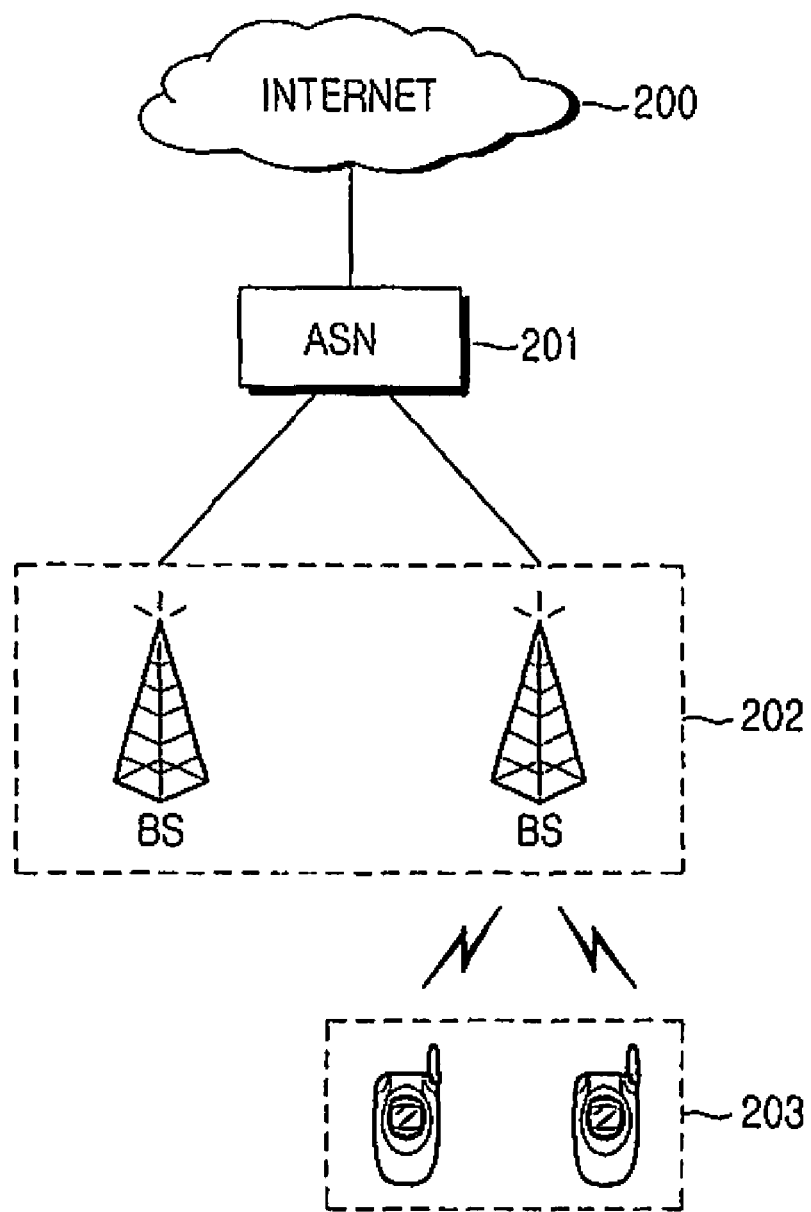
FIG. 2 is a diagram illustrating a configuration of a WiMax system, or the common $4^{th}$ generation mobile communication system.

Preferred embodiments of the present invention are described in detail with reference to the accompanying drawings. It should be noted that similar components are designated by similar reference numerals although they are illustrated in different drawings. Detailed descriptions of constructions or processes known in the art may be omitted to avoid obscuring the subject matter of the present invention.

The present invention provides a scheme capable of seamlessly performing handoff of a data service between different types of network access systems. Further, the present invention provides a method capable of seamlessly performing handoff of a data service between systems that use the same network access technology but have different system versions, and a system thereof.

To this end, the present invention provides a scheme in which the systems using different network access technologies, or different system versions using the same network access technology, each store and maintain network access setting information and Quality of Service (QoS) information used for transmitting data to a terminal. The present invention provides a scheme in which when there is a need for handoff from a particular source system to a target system, which is different from the source system in the type of the access network, or is equal to the source system in the access network type but different from the source system in the access network version, the target system acquires through the source system a terminal's identifier assigned to a terminal or an identifier of a system element (for example, PCF) in which the terminal has last registered its own information.

In addition, the present invention can provide not only the handoff between the heterogeneous systems, but also the handoff between the systems that support different versions in the same mobile communication network.

In the scheme of the present invention, the target system can find a position of the system element (for example, old PCF) that stores network access setting information and QoS information (hereinafter 'session information') necessary for transmitting data to the terminal in the target network, using an identifier of the terminal or an identifier of the system element that stores the network access setting information and QoS information of the terminal. The target system can acquire the session information from the element. The network access setting information can be information on the number of retransmissions, the transmission power, etc.

In the scheme of the present invention, the source system delivers to the target system not only the identifier information but also the data service-related information being used by the terminal, such as context information, for example, packet filter information and authentication information, so the target system can provide the seamless data service to the terminal.

The present invention provides a scheme in which a process of acquiring the network access setting information and QoS information by a target system and a process of transmitting the data service-related information such as packet filter information and authentication information necessary for providing the data service to the terminal to the target system by the source system are performed before the terminal disconnects its wireless access to the current source system.

In the scheme of the present invention, the target system can seamlessly provide the data service that was being performed in the source system, to the terminal using the session information and context information.

The present invention provides a scheme in which upon acquiring the session information and the context information, the target system transmits an access message needed by the terminal for accessing the target system, to the terminal over the source system. In the scheme of the present invention, upon receipt of the access message, the terminal can close the access to the source system and open a new access to the handoff target system.

Figure 3:
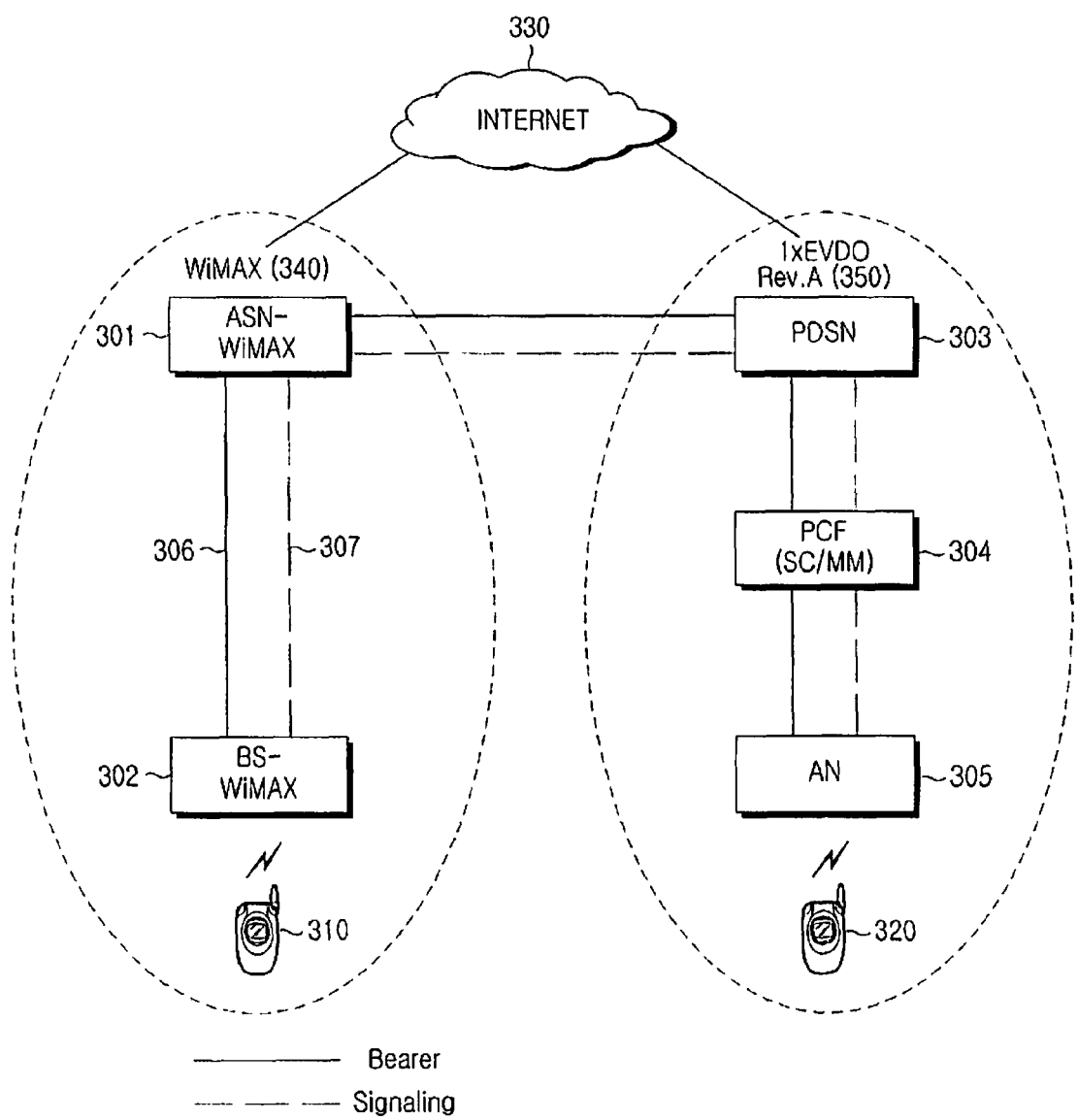
FIG. 3 is a diagram illustrating interfaces between the network elements necessary for handoff between a WiMax system and a 1xEVDO system according to an embodiment of the present invention.

FIG. 3 illustrates interfaces between the network elements necessary for handoff between a WiMax system and a 1xEVDO system according to an embodiment of the present invention. Reference numerals 301 and 302 denote elements of the WiMax system. Reference numeral 301 denotes an Access Service Network (ASN) of the WiMax network, and the ASN 301 serves as a gateway, and is connected to an Internet 330 and a WiMax network 340 to exchange high-speed packet data with a BS-WiMax (WiMax-based BS) denoted by reference numeral 302. The BS-WiMax 302 transmits the user data received via the ASN 301 to terminals 310, and delivers the user data received from the terminals to the ASN 301. Reference numeral 306 denotes a data interface between the ASN 301 and the BS-WiMax 302, and reference numeral 307 denotes an interface for a control signal.

Reference numerals 303-305 denote the elements constituting the 1xEVDO system. Reference numeral 303 denotes a Packet Data Service Node (PDSN), and the PDSN 303 serves to connect the Internet 330 to a 1xEVDO network 350. Reference numeral 304 denotes a Packet Control Function (PCF) for controlling 1xEVDO ANs (1xEVDO-based ANs) denoted by reference numeral 305, and the 1xEVDO ANs 305 each serve to transmit the user data received over the PDSN 303 and the PCF 304 to terminals 320 and to deliver the user data received from the terminals 320 to the PCF 304. In FIG. 3, the PCF 304 may include a Session Control/Mobility Management (SC/MM) for managing mobility of the terminal 320.

Herein, a PDSN of a 1xEVDO network and an ASN of a WiMax network are also referred to as a gateway, and the PCF for storing session information is also referred to as a session storage.

In the first embodiment of the present invention shown in FIG. 3, the WiMax network 340 and the 1xEVDO network 350 can exchange user data and control signals over the ASN 301 and the PDSN 303. That is, in the embodiment of FIG. 3, the interfaces for connecting the WiMax network 340 and the 1xEVDO network 350 to each other are defined only between the ASN 301 and the PDSN 303. In other words, the WiMax network 340 and the 1xEVDO network 350 are connected to each other only through the interfaces between the ASN 301 and the PDSN 303.

Figure 4A:
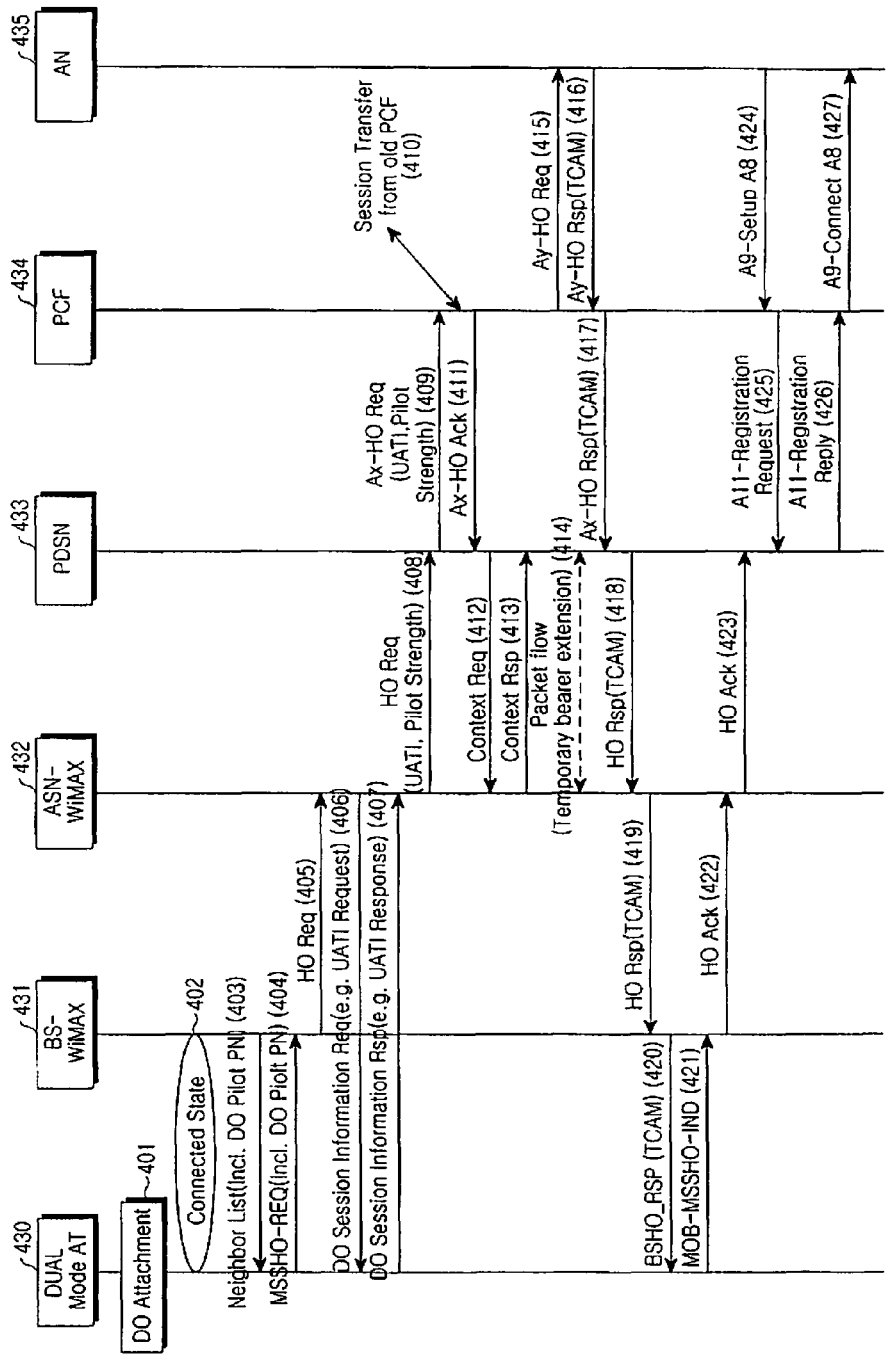
FIGS. 4A and 4B are diagrams illustrating a handoff process from the WiMax source system to the 1xEVDO target system under the architecture of FIG. 3 according to an embodiment of the present invention.
Figure 4B:
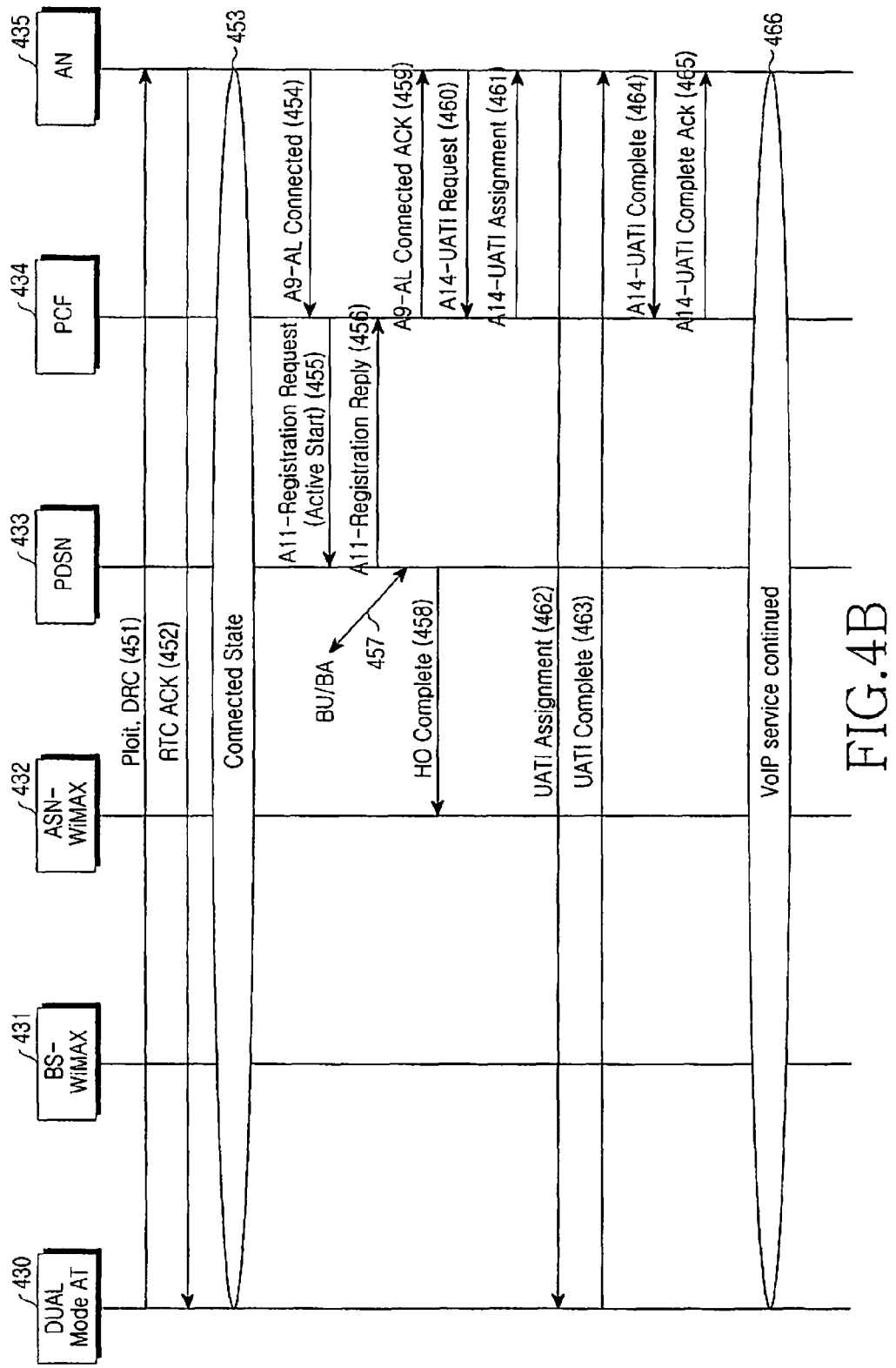

FIGS. 4A and 4B illustrate a handoff process from the WiMax source system to the 1xEVDO target system under the architecture of FIG. 3 according to an embodiment of the present invention. For convenience, the entire call flow is divided into FIGS. 4A and 4B. In the first embodiment shown in FIGS. 4A and 4B, it is assumed that a terminal 430 negotiates transmission-related session information with the WiMax system and the 1xEVDO system independently, and each of the systems stores the transmission-related session information.

In FIGS. 4A and 4B, reference numeral 430 denotes a Dual Mode Access Terminal (AT) that supports the network access technologies of both the WiMax system (or source system) and the 1xEVDO system (or target system). Reference numeral 431 denotes a Base Station (BS) of the WiMax system (BS-WiMax), and reference numeral 432 denotes an ASN of the WiMax system (ASN-WiMax). Reference numeral 433 denotes a PDSN of the 1xEVDO system, reference numeral 434 denotes a PCF of the 1xEVDO system, and reference numeral 435 denotes an Access Network (AN) of the 1xEVDO system.

In step 401 of FIG. 4A, before the dual mode terminal 430 has access to the WiMax network 340, because it negotiated with the 1xEVDO system on the transmission-related session information, the elements of the 1xEVDO system have already stored the transmission-related session information. That is, in step 401, the dual mode terminal 430 has already completed the DO session and Point-to-Point Protocol (PPP) session negotiation setting with the 1xEVDO system. Further, the PPP session to the dual mode terminal 430 is still alive (opened) in the PDSN of the 1xEVDO network to which the dual mode terminal 430 has been connected before its access to the WiMax network 340. In step 402 the dual mode terminal 430 has been connected to the WiMax system 340 before the handoff.

The BS-WiMax 431 periodically or aperiodically transmits information on its neighboring cells to the terminals 430 located in its coverage, as shown in step 403. The information on the neighboring cells is transmitted along with both information on the neighboring BSs-WiMax of the BS-WiMax 431, and information on the neighboring 1xEVDO ANs, for example, pilot Pseudo-random Noise (PN) offset information and channel information of the 1xEVDO ANs.

Upon receiving the information on the neighboring cells in step 403, the dual mode terminal 430 transmits a Mobile Subscriber Station Hand Off-Request (MSSHO-REQ) message to the BS-WiMax 431 in step 404 according to a specific criterion, for example, in which signal strength of the 1xEVDO AN is sufficiently higher than signal strength of the BS-WiMax. This transmission makes it possible to request handoff to a particular target 1xEVDO AN. In the embodiment of the present invention, because the handoff is assumed to be made from WiMax system to the 1xEVDO system, the target AN (or base station) to which the dual mode terminal (AT) 430 will make the handoff is the AN indicated by reference numeral 435 in FIGS. 4A and 4B.

Upon receiving the handoff request in step 404, the BS-WiMax 431 can forward the handoff request to the ASN 432 over a handoff request (HO Req) message in step 405. The handoff request of step 405 can include information on the 1xEVDO AN 435, request for handoff to which the dual mode terminal (AT) 430 has made. The information on the AN includes pilot PN, AN identifier (ID), and AN's sector identifiers. In step 406, upon receiving the handoff request in step 405, the ASN 432 of the WiMax network sends a request for a terminal's identifier, or Unicast Access Terminal Identifier (UATI), assigned to the terminal in the 1xEVDO network to find DO session information, to the terminal 430 over the BS-WiMax 431. The term 'DO session information' as used herein refers to session information of 1xEVDO, and the terms 'DO' and '1xEVDO' have the same meaning herein. Upon receiving the UATI request in step 406, the terminal 430 delivers the terminal identifier UATI assigned by the 1xEVDO network to the ASN 432 of the WiMax network in step 407 via the BS-WiMax 431 in response to the UATI request. Upon acquiring the UATI of the terminal 430 in step 407, the ASN 432 of the WiMax network sends a handoff request message with the UATI to the 1xEVDO PDSN 433 of the target system in step 408.

In finding the target 1xEVDO PDSN 433 in step 408 by the ASN 432 of the WiMax network, there is a possible method in which the 1xEVDO PDSN associated with the ASN 432 is always used, or the information (for example, pilot PN offset) of the target 1xEVDO AN, request for handoff to which the terminal has made, is used. The handoff request of step 408 can be transmitted along with the information on the 1xEVDO AN, request for handoff to which the terminal has made.

Upon receiving the handoff request in step 408, the 1xEVDO PDSN 433 forwards the handoff request to the 1xEVDO PCF 434 that controls the 1xEVDO AN 435 to which the terminal 430 intends to make handoff, in step 409. The handoff request of step 409 can include the UATI that the terminal 430 is assigned from the old PCF of the 1xEVDO network, and the information on the target 1xEVDO AN 435 to which the terminal 430 intends to perform handoff.

Generally, in the 1xEVDO system, the UATI is associated with one 1xEVDO PCF, and transmission-related session information of the terminal assigned the UATI is stored in the corresponding 1xEVDO PCF. The 1xEVDO PCF 434 selected in step 409 can be different from the 1xEVDO PCF that assigned the UATI when the dual mode terminal 430 previously accessed the 1xEVDO network. In this case, the session information of the corresponding terminal is located in the PCF that assigned the UATI included in the handoff request of step 409. Therefore, upon receiving the handoff request of step 409, the 1xEVDO PCF 434 can find the Old PCF that assigned the old UATI, using the old UATI included in the handoff request, and performs an operation of receiving session information of the terminal from the Old PCF in step 410. The 1xEVDO PCF 434 of the target 1xEVDO system, after acquiring the session information, assigns a new UATI associated with the 1xEVDO PCF 434 to the terminal 430 while performing the handoff process. In the session information acquired from the Old PCF in step 410, the network access setting information is the information on the number of retransmissions and the transmission power.

Upon receiving the session information from the undepicted Old PCF in step 410, the 1xEVDO PCF 434 sends a handoff acknowledge (HO Ack) message indicating the acceptance of handoff, to the 1xEVDO PDSN 433 in step 411. Upon receiving the handoff response message in step 411, in step 412 the 1xEVDO PDSN 433 sends a request for transmission of context information, or data service-related information of the terminal 430, to the ASN 432 of the WiMax network. In response, the ASN 432 of the WiMax network transmits the context information of the corresponding terminal 430 to the 1xEVDO PDSN 433 in step 412. The context information can be filtering information and authentication information. After delivering the context information of the terminal 430 to the 1xEVDO PDSN 433 in step 413, the ASN 432 of the WiMax network can deliver the data left in its own buffer to the 1xEVDO PDSN 433 in step 414.

Upon accepting the handoff in step 411, in step 415 the 1xEVDO PCF 434 forwards the handoff request to the target 1xEVDO AN 435 to which the terminal 430 intends to make handoff, in order to acquire an air resource-related parameter from the target 1xEVDO AN 435. Upon receiving the handoff request of step 415, the target 1xEVDO AN 435 assigns air resources to the terminal 430 to assign a traffic channel for data communication with the terminal 430, and transmits through steps 416 to 419 a Traffic Channel Assignment Message (TCAM) including information on the assigned air resources to the BS 431 of the WiMax network via the 1xEVDO PCF 434, the 1xEVDO PDSN 433, and the ASN 432 of the WiMax network. In step 420, the BS 431 of the WiMax network forwards the TCAM message to the terminal 430 over a Base Station Hand Off Response (BSHO-RSP) message.

By receiving the BSHO-RSP message of step 420, the terminal 430 is assigned 1xEVDO air resources, and upon receiving information related thereto through the message of step 420, the terminal 430 can start communication with the 1xEVDO network using the 1xEVDO radio access technology. After finally determining the handoff to the 1xEVDO network, in step 421 the terminal 430 transmits a Mobile Subscriber Station-Indication (MSSHO-IND) message to the WiMax network's BS 431 to thereby notify the target 1xEVDO AN 435 to which it will make handoff, and disconnects the wireless connection to the WiMax network. Thereafter, the terminal 430 transmits a pilot channel and a Data Rate Control (DRC) channel to the 1xEVDO AN 435 in step 451, and receives a Reverse Traffic Channel (RTC) Acknowledged (ACK) signal from the 1xEVDO AN 435 in step 452, thereby acquiring a reverse channel. In step 453, the terminal 430 accesses the 1xEVDO network through the wireless connection. The terminal 430 can continuously receive the service data over the WiMax wireless connection until it disconnects the wireless connection to the WiMax network in step 421 after it started the handoff with the WiMax system elements 431 and 432 in step 404. That is, the terminal 430 does not suffer from any service drop (disconnection) until step 421 in performing the data service.

Upon receiving the MSSHO-IND message from the terminal 430 in step 421, the BS-WiMax 431 delivers the information indicating the occurrence of handoff to the ASN 432 of the WiMax network through a handoff acknowledged (HO Ack) message in step 422. In step 423, the ASN 432 of the WiMax network forwards the HO Ack message to the 1xEVDO PDSN 433 to notify the occurrence of handoff.

The 1xEVDO AN 435, which assigned air resources to the corresponding terminal 430 in step 416, sets up an A8 interface for data exchange with the 1xEVDO PCF 434 through steps 424 and 427, and sets up an A10 interface for data exchange with the 1xEVDO PDSN 433 through steps 425 and 426. In the state of steps 424 to 427, the data is not actually transmitted/received and the interfaces for data transmission/reception are merely previously set up. After completing the wireless connection setup to the corresponding terminal 430 in steps 451 to 453, the 1xEVDO AN 435 activates the A8 and A10 interfaces set up in steps 424 to 427, through a process of steps 454 to 459. After steps 454 to 459, the 1xEVDO AN 435 and the 1xEVDO PCF 434 assign a new terminal identifier UATI to be used in the coverage of the target 1xEVDO PCF 434, to the corresponding terminal 430 through steps 460 to 465.

In step 459, the PCF 434 transmits an A9-AL Connected ACK message to the AN 435 in response to step 454, and then the AN 435 transmits an A14-UATI Request message for requesting assignment of new UATI of the terminal 430 to the PCF 434 in step 460. In step 461, the PCF transmits to the AN 435 the A14 UATI Assignment message for reporting a completion of a New UATI assignment for the terminal 430 in response to the A14-UATI request message, and the AN 435 transmits the A14 UATI Assignment message to the terminal in step 462. And, the terminal 430 receiving the A14 UATI Assignment message from the AN 435 transmits a UATI Complete message to the AN 435 in response to the UATI assignment message in step 463, and the AN 435 transmits the UATI Complete message to the PCF 434 in step 464. The PCF 434 transmits an A14 UATI Complete Ack message to the AN 435 in response to the A14 UATI Complete message.

Upon receiving a report indicating the completion of the wireless connection setup to the corresponding terminal 430 through an A11 Registration Request message in step 455, the 1xEVDO PDSN 433 sends in step 456 an A11 Registration Reply message, or an acknowledgement message, to the 1xEVDO PCF 434 in response to the message received in step 455. Thereafter, in step 457, the PDSN 433 exchanges a Binding Update (BU) message and a Binding Acknowledgement (BA) message with the undepicted Foreign Agent (FA) to change the path of the packet transmitted to the terminal 430 from the ASN 432 of the WiMax network to the 1xEVDO PDSN 433. In step 458, the PDSN 433 can send a Handoff Complete message indicating the completion of the handoff to the ASN 432 of the WiMax network.

In the state of step 466, as the handoff between the WiMax system and the 1xEVDO system is completed, the service, for example, VoIP service, which was being performed in the WiMax system, is now being performed by the 1xEVDO network.

Figure 5:
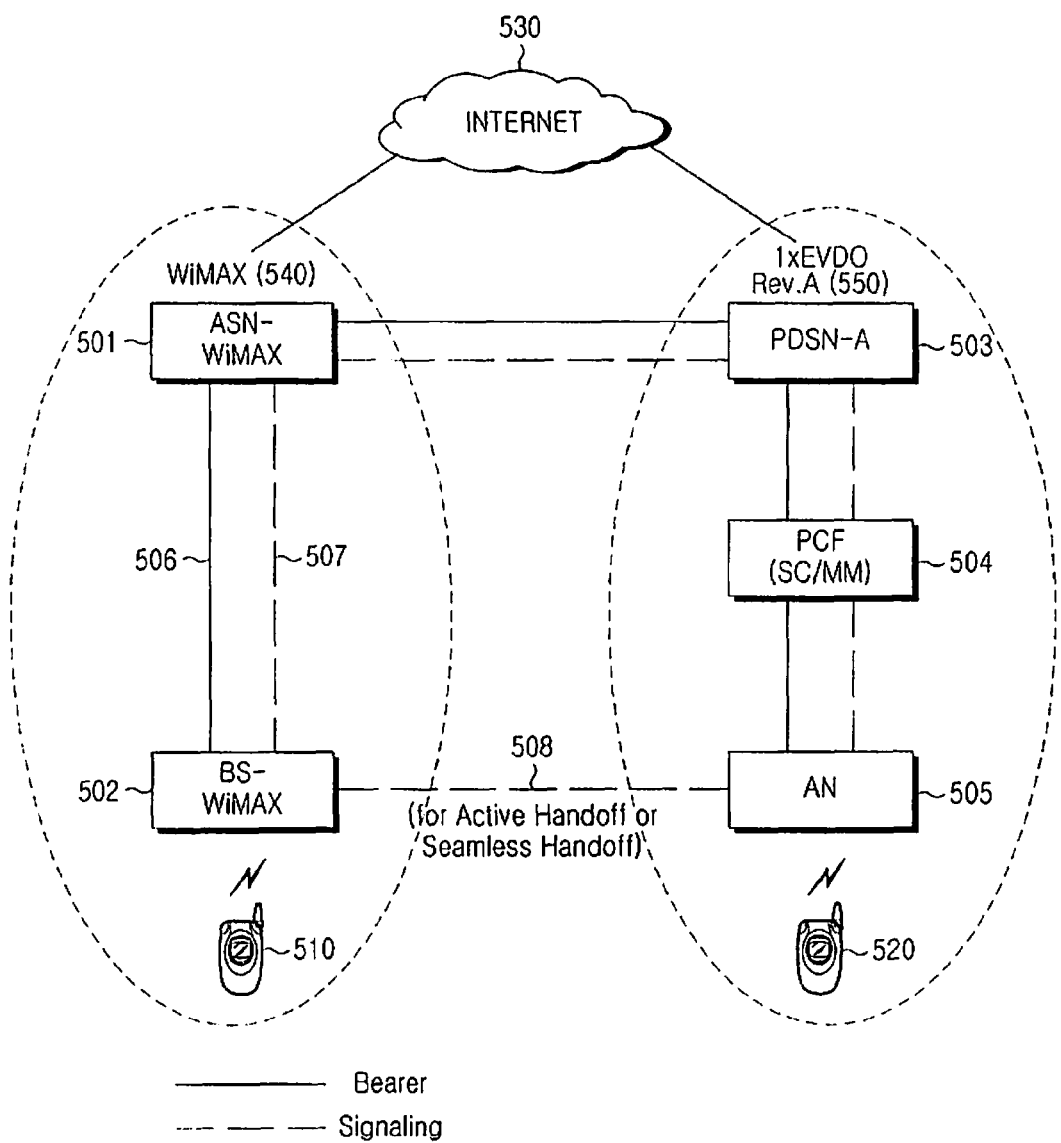
FIG. 5 is a diagram illustrating interfaces between the network elements necessary for handoff between a WiMax system and a 1xEVDO system according to an embodiment of the present invention.

FIG. 5 illustrates interfaces between the network elements necessary for handoff between a WiMax system and a 1xEVDO system according to an embodiment of the present invention. In the architecture of FIG. 5, unlike in architecture of FIG. 3, an interface 508 for control signals exists between a BS-WiMax 502 and a 1xEVDO AN 505.

Reference numeral 501 denotes an ASN of the WiMax network, and the ASN 501 connects Internet 530 to WiMax network 540 to exchange high-speed packet data with the BS-WiMax 502. The BS-WiMax 502 serves to transmit the user data received via the ASN 501 to terminals 510, and to deliver the user data received from the terminals 510 to the ASN 501. Reference numeral 506 denotes a data interface between the ASN 501 and the BS-WiMax 502, and reference numeral 507 denotes an interface for control signals.

Reference numerals 503-505 denote the elements constituting the 1xEVDO system. Reference numeral 503 denotes a PDSN, and PDSN 503 serves to connect the Internet 530 to 1xEVDO network 550. Reference numeral 504 denotes a PCF for controlling 1xEVDO ANs 505, and the 1xEVDO ANs 505 each serve to transmit the user data received via the PDSN 503 and PCF 504 to terminals 520, and to deliver the data received from the terminals 520 to the PCF 504. In FIG. 5, the PCF 504 can include an SC/MM.

Figure 6A:
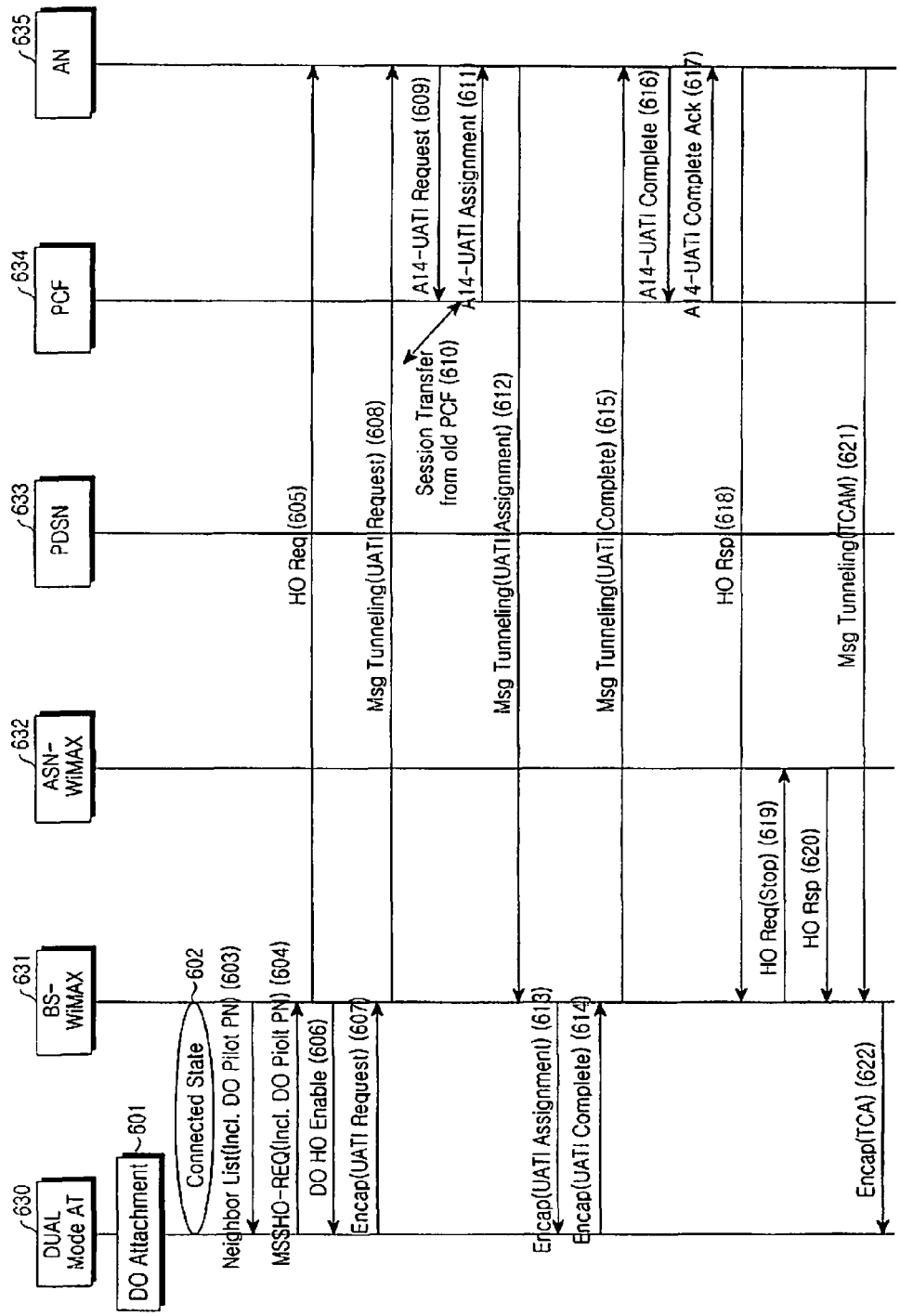
FIGS. 6A and 6B are diagrams illustrating a handoff process from the WiMax source system to the 1xEVDO target system under the architecture of FIG. 5 according to an embodiment of the present invention.
Figure 6B:
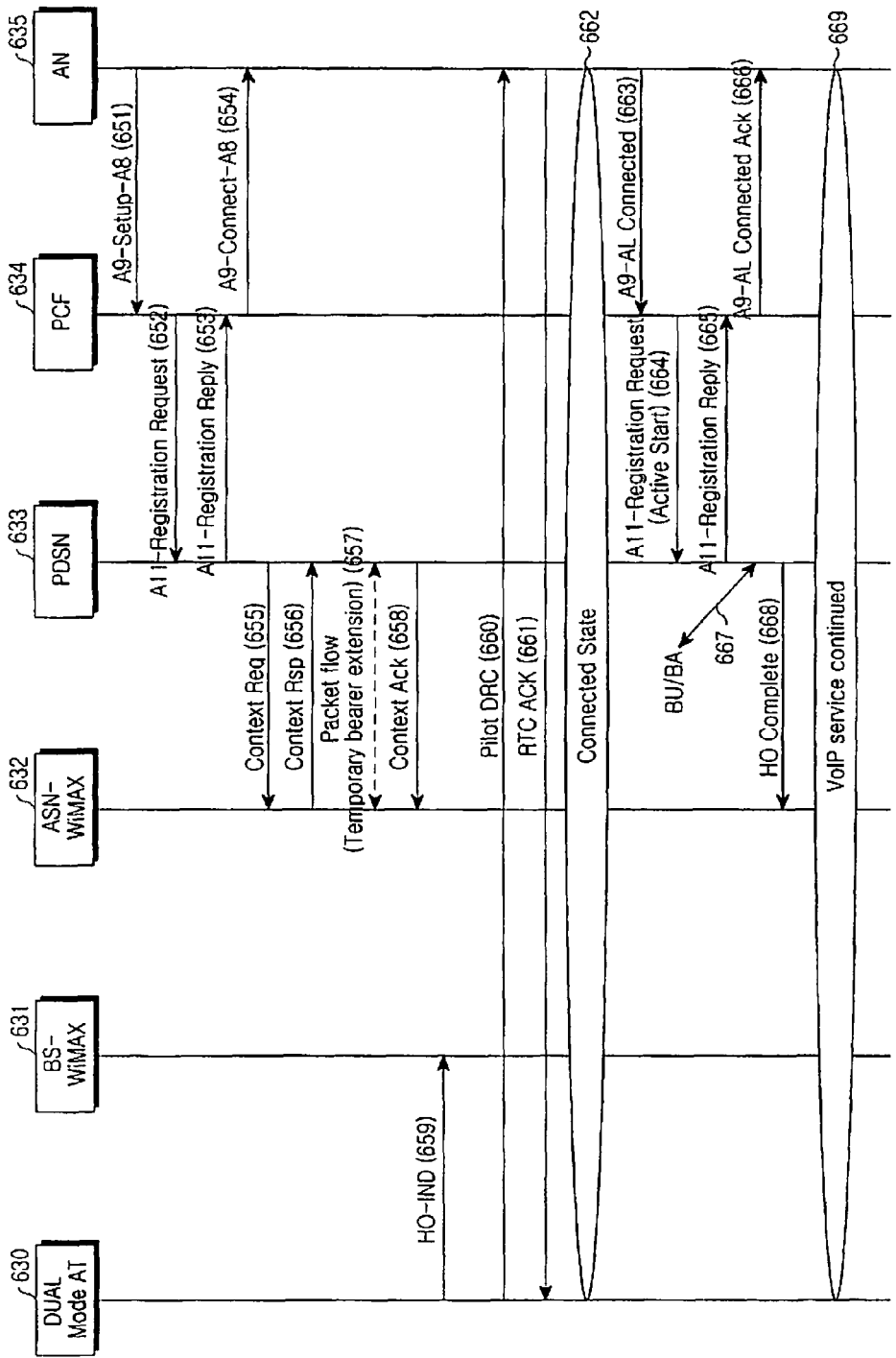

FIGS. 6A and 6B illustrate a handoff process from the WiMax source system to the 1xEVDO target system under the architecture of FIG. 5 according to an embodiment of the present invention. For convenience, the entire call flow is divided into FIGS. 6A and 6B. In the second embodiment shown in FIGS. 6A and 6B, it is assumed that a terminal negotiates transmission-related session information with the WiMax system and the 1xEVDO system independently, and each of the systems stores the transmission-related session information.

In FIGS. 6A and 6B, reference numeral 630 denotes a Dual Mode Access Terminal (AT) that supports the network access technologies of both the WiMax system (or source system) and the 1xEVDO system (or target system). Reference numeral 631 denotes a Base Station (BS) of the WiMax system, and reference numeral 632 denotes an ASN of the WiMax system. Reference numeral 633 denotes a PDSN of the 1xEVDO system, reference numeral 634 denotes a PCF of the 1xEVDO system, and reference numeral 635 denotes a 1xEVDO AN.

In step 601 before the dual mode terminal 630 moves to the WiMax network 540, because it previously negotiated with the 1xEVDO system on the transmission-related session information, the elements of the 1xEVDO system have already stored the transmission-related session information. That is, in step 601, the dual mode terminal 630 has already completed the DO session and PPP session negotiation setting with the 1xEVDO system, and the PPP session to the dual mode terminal 630 is still alive (opened) in the PDSN of the 1xEVDO network to which the dual mode terminal 630 has been connected before its access to the WiMax network 540. In step 602 the dual mode terminal 630 has already been connected to the WiMax system 540 before the handoff to the 1xEVDO system 550.

The BS-WiMax 631 periodically or aperiodically transmits information on its neighboring cells to the terminals 630 located in its coverage, as shown in step 603. The information on the neighboring cells is transmitted along with not only the information on the neighboring BSs-WiMax of the BS-WiMax 631 but also the information on the neighboring 1xEVDO ANs, for example, pilot PN offset information and channel information of the 1xEVDO ANs. Upon receiving the information on the neighboring cells, in step 604 the dual mode terminal 630 transmits a MSSHO-REQ message to the BS-WiMax 631 according to a specific criterion, for example, in which signal strength of the 1xEVDO AN 635 is sufficiently higher than signal strength of the BS-WiMax 631. This makes it possible to request handoff to a particular target 1xEVDO AN 635. The handoff request of step 604 can include information on the target 1xEVDO AN 635, request for handoff to which the terminal 630 has made. Upon receiving the handoff request in step 604, the BS-WiMax 631 sends a handoff request to the target 1xEVDO AN 635 in step 605, and sends a DO HO Enable message indicating availability of handoff to the corresponding terminal 630 in step 606.

Upon receiving the DO HO Enable message of step 606, the terminal 630 encapsulates a UATI request message for requesting a new terminal identifier UATI in step 607, and sends the encapsulated UATI request message to the target 1xEVDO AN 635 in step 608 via the BS-WiMax 631. The UATI request message is transmitted along with the old UATI that the terminal 630 was assigned in the 1xEVDO network.

Upon receiving the new UATI request message of the terminal 630 in step 608, the 1xEVDO AN 635 forwards the UATI request message to the 1xEVDO PCF 634 that controls the corresponding 1xEVDO AN 635 in step 609. Upon receiving the new UATI request message in step 609, the 1xEVDO PCF 634 can find the Old PCF that assigned the old UATI, using the old UATI information included in the UATI request message, and performs an operation of acquiring session information of the terminal 630 from the found Old PCF in step 610. Upon acquiring the session information of the terminal 630 from the Old PCF in step 610, the 1xEVDO PCF 634 delivers the new UATI associated with its own coverage to the 1xEVDO AN 635 in step 611. The 1xEVDO AN 635 delivers through steps 612 to 615 the identifier (New UATI) newly assigned by the 1xEVDO PCF 634, to the terminal 630 via the BS-WiMax 631, and provides through steps 616 and 617 the information indicating the completion of assignment of the identifier of the terminal 630, to the 1xEVDO PCF 634.

After completing the assignment of the new terminal identifier, in step 618 the 1xEVDO AN 635 can provide the information indicating the completion of the session acquisition and the identifier assignment to the BS-WiMax 631 using a response message to the handoff request message received in step 605. Upon receiving the handoff response (HO Rsp) message of step 618, the BS-WiMax 631 sends in steps 619 and 620 a handoff request for the terminal 630 to the ASN 632 of the WiMax network to prevent new data from being transmitted to the BS-WiMax 631, for the terminal 630.

The 1xEVDO AN 635, which delivered in step 618 the information indicating the completion of the session acquisition and the identifier assignment to the BS-WiMax 631, assigns air resources to the terminal 630 to perform data transmission/reception with the terminal 630 over a traffic channel in step 621, and sends a 1xEVDO TCAM message including information on the assigned air resources to the BS-WiMax 631. The BS-WiMax 631 encapsulates the TCAM message and delivers the encapsulated TCAM message to the terminal 630 in step 622.

After assigning air resources to the terminal 630 and delivering the 1xEVDO TCAM message to the terminal 630, the 1xEVDO AN 635 sets up an A8 interface for data exchange with the 1xEVDO PCF 634 in steps 651 and 654, and sets up an A10 interface for data exchange with the 1xEVDO PDSN 633 in steps 652 and 653. In the state of steps 651 to 654, the data is not actually transmitted/received and the interfaces for data transmission/reception are merely previously set up.

Upon receiving a setup request for the A10 interface in step 652, the 1xEVDO PDSN 633 sets up an A10 data interface for the corresponding terminal 630, and provides the information indicating the completed setup of the A10 interface, to the 1xEVDO PCF 634 in step 653. After setting up the A10 interface, the 1xEVDO PDSN 633 sends a transmission request for the context information, or data service-related information, of the terminal 630 to the WiMax ASN 632 in step 655. In response, the ASN 632 of the WiMax network transmits context information of the terminal 630 to the 1xEVDO PDSN 633 in step 656. The context information can be filtering information, authentication information, etc. After delivering the context information of the terminal 630 to the 1xEVDO PDSN 633 in step 656, the ASN 632 of the WiMax network can deliver the data left in its own buffer, to be transmitted to the terminal 630, or the data transmitted from the terminal 630, to the 1xEVDO PDSN 633 in step 657. Upon receiving the context information of the terminal 630 in step 656, the 1xEVDO PDSN 633 transmits in step 658 a response to the received context information to the WiMax ASN 632, completing the context delivery process.

The terminal 630, which was assigned 1xEVDO air resources and received the information on the assigned air resources over the TCAM message of step 622, can start communication with the 1xEVDO network 550 using the 1xEVDO radio access technology. Upon finally determining handoff to the 1xEVDO network 550, the terminal 630 disconnects the wireless connection to the WiMax network 540 using a HO-IND message in step 659, and sets up a wireless connection to the 1xEVDO network 550 through steps 660 to 662. The terminal 630 can continuously receive the service data over the WiMax wireless connection until it disconnects the wireless connection to the WiMax network 540 in step 659 after it started the handoff with the WiMax system in step 604. That is, the terminal 630 does not suffer from any service drop (disconnection) until step 659 in performing the data service.

After completing the wireless connection setup to the terminal 630 in step 660 to 662, the 1xEVDO AN 635 provides, through steps 663 to 666, the 1xEVDO PCF 634 and the 1xEVDO PDSN 633 with the information indicating the activation of the A8 and A10 interfaces previously set up in steps 651 to 654. Upon receiving the report indicating the activation of the A8 and A10 interfaces with the terminal 630 in step 664, in step 665 the 1xEVDO PDSN 633 sends an A11 Registration Reply message, or acknowledgement message, to the 1xEVDO PCF 634 in response to the message of step 664. Thereafter, in step 667, the 1xEVDO PDSN 633 exchanges a BU message and a BA message with the undepicted FA to change the path of the packet transmitted to the terminal 630 from the WiMax ASN 632 to the 1xEVDO PDSN 633. In step 668, the 1xEVDO PDSN 633 can send a Handoff Complete message indicating the completion of the handoff to the ASN 632 of the WiMax network.

Finally, in step 669, as the handoff between the WiMax system 540 and the 1xEVDO system 550 is completed, the service, for example, VoIP service, which was being performed in the WiMax system 540, is now being performed by the 1xEVDO network 550.

Although the description of the embodiments of the present invention are directed to the handoff performed from the WiMax system to the 1xEVDO system, the same method can be applied even to the handoff from the 1xEVDO system to the WiMax system, or the handoff between any two arbitrary different systems.

As is apparent from the foregoing description, the efficient handoff scheme proposed by the embodiments of the present invention can seamlessly perform handoff of the data service between different types of network access systems.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing handoff between a source system and a target system having a different network access standard from that of the source system, the method comprising:

transmitting, by an access terminal connected to the source system, a request message including an identifier of the access terminal to be identified in the target system, to the target system, via the source system, in order to access the target system;

acquiring, by a session storage of the target system, the identifier of the access terminal, from the access terminal, via the source system;

acquiring, by the session storage of the target system, session information of the access terminal from an old session storage of the source system to which the access terminal was connected and the old session storage is searched using the identifier of the access terminal, before it accesses the source system;

acquiring, by a gateway of the target system, context information related to a data service of the access terminal from a gateway of the source system, after the session information is acquired;

assigning, by the session storage of the target system, a new identifier, by which the access terminal is to be identified in the target system, to the access terminal, using the identifier of the access terminal, before providing the data service, after the session information and the context information are acquired; and providing, by the target system, the data service to the access terminal using the session information and the context information, after handoff of the access terminal.

2. The method of claim 1, wherein the source system comprises a Worldwide Interoperability for Microwave Access (WiMax) system, the target system comprises a 1x Evolution Data Only (1xEVDO) system, the session storage comprises a Packet Control Function (PCF), the gateway of the target system comprises a Packet Data Service Node (PDSN) and the gateway of the source system comprises an Access Service Network (ASN).

3. The method of claim 2, wherein the session information comprises network access setting information and Quality of Service (QoS) information of the 1xEVDO system to which the access terminal was connected before it accesses the WiMax system.

4. The method of claim 2, wherein the context information comprises filtering information and authentication information used by the WiMax system for providing the data service to the access terminal.

5. The method of claim 2, wherein the identifier of the access terminal comprises a Unicast Access Terminal Identifier (UATI).

6. The method of claim 2, wherein the identifier of the access terminal is delivered from the ASN of the source system to the PCF of the target system via the PDSN of the target system.

7. The method of claim 2, wherein the identifier of the access terminal is delivered from a Base Station (BS) of the source system to the PCF of the target system via an Access Network (AN) of the target system.

8. The method of claim 5, wherein the identifier of the access terminal, acquired from the source system by the PCF of the target system, comprises an old UATI that the access terminal was assigned from an old PCF.

9. The method of claim 8, wherein the session information is acquired from the old PCF searched using the old UATI.

10. A system for providing handoff between a source system and a target system, the target system having a different network access standard from that of the source system, the system comprising:

an access terminal, connected to the source system, for transmitting a request message comprising an identifier to be identified in the target system, to the target system, via the source system, in order to access the target system;

a session storage of the target system for acquiring the identifier of the access terminal from the access terminal via the source system, and acquiring session information of the access terminal from an old session storage of the source system to which the access terminal was connected and the old session storage is searched using the identifier of the access terminal, before it accesses the source system; and a gateway of the target system for, after the session information is acquired, acquiring context information related to a data service of the access terminal from a gateway of the source system, wherein after the session information and the context information are acquired, the session storage of the target system assigns a new identifier, by which the access terminal is to be identified in the target system, to the access terminal, by using the identifier of the access terminal, before providing the data service, and wherein the session information and the context information are used for providing the data service to the access terminal after handoff of the access terminal.

11. The system of claim 10, wherein the source system comprises a Worldwide Interoperability for Microwave Access (WiMax) system, the target system comprises a 1x Evolution Data Only (1xEVDO) system, the session storage comprises a Packet Control Function (PCF), the gateway of the target system comprises a Packet Data Service Node (PDSN) and the gateway of the source system comprises an Access Service Network (ASN).

12. The system of claim 11, wherein the session information comprises network access setting information and Quality of Service (QoS) information of the 1xEVDO system to which the access terminal was connected before it accesses the WiMax system.

13. The system of claim 11, wherein the context information comprises filtering information and authentication information used by the WiMax system for providing the data service to the access terminal.

14. The system of claim 11, wherein the identifier of the access terminal comprises a Unicast Access Terminal Identifier (UATI).

15. The system of claim 11, wherein the identifier of the access terminal is delivered from the ASN of the source system to the PCF of the target system via the PDSN of the target system.

16. The system of claim 11, wherein the identifier of the access terminal is delivered from a Base Station (BS) of the source system to the PCF of the target system via an Access Network (AN) of the target system.

17. The system of claim 14, wherein the identifier of the access terminal, acquired from the source system by the PCF of the target system, comprises an old UATI that the access terminal was assigned from an old PCF.

18. The system of claim 17, wherein the session information is acquired from the old PCF searched using the old UATI.

19. A method for performing, by an access terminal, handoff between a source system and a target system, the target system having a different network access standard from that of the source system, the method comprising:

receiving neighboring cell information from the source system;

transmitting a request message for handoff to the target system, to the source system using the neighboring cell information;

after transmitting the handoff request message, transmitting a request message including an identifier of the access terminal to be identified in the target system, to the target system, via the source system;

receiving a new identifier by which the access terminal can be identified in the target system, assigned from the target system that has acquired session information of the access terminal and context information related to a data service of the access terminal, using the identifier transmitted by the access terminal; and receiving the data service provided from the target system, using the session information and the context information, wherein the session information of the access terminal is acquired from an old session storage of the source system to which the access terminal was connected and the old session storage is searched using the identifier of the access terminal, before it accesses the source system.

20. The method of claim 19, wherein the source system comprises a Worldwide Interoperability for Microwave Access (WiMax) system and the target system comprises a 1x Evolution Data Only (1xEVDO) system.

21. The method of claim 20, wherein the identifier of the access terminal comprises a Unicast Access Terminal Identifier (UATI).

22. The method of claim 20, wherein the identifier of the access terminal, transmitted by the access terminal to the target system via the source system, comprises an old Unicast Access Terminal Identifier (UATI) that the access terminal was assigned from an old Packet Control Function (PCF) to which it was connected before its access to the source system.

23. The method of claim 22, wherein the session information is acquired from the old PCF searched using the old UATI.

* * * * *